United States Patent [19]
Ikeda et al.

[11] 4,319,216
[45] Mar. 9, 1982

[54] DISCHARGE RESISTOR

[75] Inventors: Toshio Ikeda, Yokohama; Ziro Tsukada; Takashi Mera, both of Kawasaki, all of Japan

[73] Assignee: Tokyo Shibaura Denki Kabushiki Kaisha, Japan

[21] Appl. No.: 128,292

[22] Filed: Mar. 7, 1980

[30] Foreign Application Priority Data

Sep. 28, 1979 [JP] Japan ............................ 54-133366[U]
Mar. 14, 1979 [JP] Japan .................................. 54-28610

[51] Int. Cl.³ .............................................. H01C 3/02
[52] U.S. Cl. ........................................ 338/61; 310/72; 338/62; 338/282; 338/304
[58] Field of Search ...................... 338/61, 62, 63, 275, 338/282, 296, 304, 20; 310/72, 11

[56] References Cited
U.S. PATENT DOCUMENTS

| | | | |
|---|---|---|---|
| 745,759 | 12/1903 | Baehr | 338/282 X |
| 3,011,083 | 11/1961 | Jacob | 310/72 |
| 3,240,968 | 3/1966 | Lee | 310/72 X |
| 3,371,235 | 2/1968 | Hoover | 310/68 R |
| 3,575,622 | 4/1971 | Nielson et al. | 310/72 X |
| 3,925,695 | 12/1975 | Raby | 310/72 |

FOREIGN PATENT DOCUMENTS
566559 1/1945 United Kingdom .

OTHER PUBLICATIONS
*GEC Machines Limited* catalog, "Large Synchronous Motors, Type A, Brushless", Reference No. 3371-3, p. 6.
BBC Brown Boveri, "Three Phase Synchronous Motors, Type WM400 . . . 1000 with 4-14 Poles, for High Voltage", Publication No. CH-T5432E, pp. 10-13.

*Primary Examiner*—C. L. Albritton
*Attorney, Agent, or Firm*—Finnegan, Henderson, Farabow, Garrett & Dunner

[57] ABSTRACT

A discharge resistor adapted to be mounted on a rotatable shaft of a dynamo-electric device comprises a pair of spirally wound, insulated resistor elements and means for supporting these elements approximately coaxially with the shaft. Each of the resistor elements is spirally wound in a flatwise manner with a bore having an effective diameter greater than that of the shaft, and insulation layers are provided between adjacent turns thereof. The resistor elements are arranged and connected electrically in series such that the inductive impedance appearing across the respective resistor elements effectively cancel each other.

13 Claims, 12 Drawing Figures

DISCHARGE RESISTOR

BACKGROUND OF THE INVENTION

This invention relates to discharge resistors, and more particularly to such resistors for use in dynamo-electric machines such as brushless synchronous motors.

In brushless synchronous motors, rotating field coils of the motors are connected through rectifying devices to rotating armature coils of exciters. The rotating field coils of the motors, the rectifying devices, and the rotating armature coils of the exciters rotate in unison, and the field current in such field coils is controlled by controlling the current in the stationary field coils of the exciters. However, during start up of the motors, in which the motors run in an asynchronous manner, i.e., out of synchronization, relatively high a-c voltage appears in the field coils of the motors, as is well-known in the art. Such voltage occasionally may rise to over 10,000 volts, although this will depend on the size of the motor. Such relatively high voltage also tends to appear upon a sudden change in the inner phase angle of synchronous motors due to the abrupt change in the mechanical load thereof. Accordingly, it is necessary to protect the field coils themselves, and also the rectifying devices, from suffering adverse effects such as insulation breakage due to such high voltage.

To provide the necessary protection, discharge resistors, i.e., starting resistors, are usually mounted on the shaft of the motors in such a manner as to shunt the field coils. There are currently two methods for connecting the resistor in parallel with the field coil. According to one method, the discharge resistor is connected to shunt the field coil only during start up of the motor. This method can be employed when it is expected that any damage to the motor due to abnormal voltage in steady state operation (which may appear upon a sudden change in the inner phase angle of the synchronous motor) will be negligible.

In the other method, the discharge resistor may be connected to shunt the field coil of the motor at any time.

Desirable basic features for discharge resistors include the following:

(a) the resistivity required for pertinent protection can be easily obtained;

(b) they have substantially no inductive impedance;

(c) they have predetermined heat dissipation ability;

(d) they are durable against ambient conditions, i.e., they are substantially free from corrosion, oxidization, insulation wear, and the like; and (e) they are of simple construction and can withstand the centrifugal forces present during operation.

Typical prior art discharge resistors are comprised of disk-like metal casings filled with insulating material in which resistor wires, such as nichrome wires, are buried. As can be easily understood, such resistor wires are very difficult to obtain in the desired length, and, in turn, the desired resistivity. The disk-like metal casings are adapted to be mounted on the motor shaft to keep the insulating material, and the resistor wires buried therein, in a predetermined position when the shaft rotates. In this prior art system, the surface area of the resistor wires through which heat generated by the resistor dissipates is relatively small, so that the temperature of the resistor rises relatively high, e.g., from 400° C. to 1000° C. It has thus been necessary to use insulating material capable of withstanding relatively high temperatures. This, in turn, means that the resistor wire must be surrounded by a considerable amount of insulating material, since material having very good insulation characteristics, such as organic insulating material, generally has relatively poor durability against temperature rise and cannot, therefore, be used. Surrounding the resistor wire by large amounts of insulating material also causes the rate of heat transfer to be low, thereby resulting in a greater temperature rise in the resistor wire. There are disadvantages such that, for example, the volume and weight of the resistor is relatively large, thereby causing the motor to be larger. In case of high speed motors, particularly, it may be necessary to provide a third journal rotatably supporting the motor shaft for safety purposes. Dielectric strength of inorganic insulating material is also apt to decrease due to absorption of moisture. From these disadvantages, freedom in designing the resistors is relatively small, so that it becomes difficult to obtain non-inductive resistance.

Regarding the resistors used to shunt the field coils of the motors only during start up, temperature rise in the resistor depends mainly on the heat capacity, $Q/(W\,C)$, of the resistor wires, where Q is generated heat, W is weight of the resistor wire, and C is specific heat of the resistor wire. That is, it is necessary to increase the weight W of the resistor wire to decrease the temperature rise in this type of application.

To solve this problem, resistors have been developed which include a strip-like resistor member which is wound edgewise and folded back at each turn to cancel inductivity, with clearances between adjacent turns. Such a resistor member is coaxially supported by frame member supports. This structure, however, is difficult to manufacture, particularly in connection with the edgewise winding of the resistor strip.

SUMMARY OF THE INVENTION

Accordingly, it is an object of this invention to provide nearly non-inductive discharge resistors of simple construction and reduced size.

It is another object of this invention to provide nearly non-inductive discharge resistors having improved durability against ambient conditions.

It is still another object of this invention to provide nearly non-inductive discharge resistors having improved heat dissipation characteristics.

According to one aspect of this invention, a discharge resistor adapted to be mounted on a rotatable shaft of a dynamo-electric machine comprises a pair of strip-like resistor elements, each of the elements being wound in a flatwise manner and leaving a central bore portion adapted to be penetrated through by the shaft, and paired wound elements being arranged and electrically connected in series such that overall inductive impedance appearing across the series connection is approximately cancelled, insulation for insulating adjacent turns of the wound resistor elements from each other, and means for supporting the wound elements approximately coaxially with the shaft at predetermined positions.

DETAILED DESCRIPTION OF THE PREFERRED EMBODIMENTS

Figure 1:
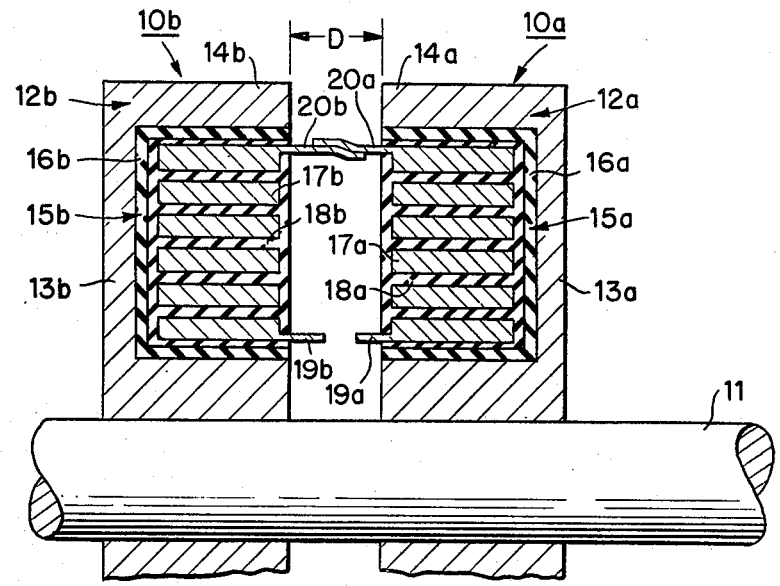
FIG. 1 shows a cross-sectional view, partially cut away, of one embodiment of a discharge resistor according to this invention mounted on a motor shaft.

Referring now to FIG. 1, a discharge resistor constructed in accordance with the present invention comprises a pair of resistor units, generally indicated at 10a and 10b, each being mounted on a motor shaft 11. A pair of disk-like casings 12a and 12b of non-magnetic material such as stainless steel is adapted to be mounted on the shaft 11 by a suitable technique such as, for example, thermal insertion, as is well known in the art.

The casings 12a and 12b have relatively thin disk-like wall portions 13a and 13b extending perpendicularly to the shaft 11, and relatively thick peripheral wall portions 14a and 14b extending along the shaft 11 from respective peripheral edges of the wall portions 13a and 14b. Thus, the casings 12a and 12b have annular recesses for containing wound web resistor arrangements, designated generally by the numeral 15 and individually by the numerals 15a and 15b, which face each other. Insulation layers 16a and 16b of organic insulation material such as epoxy resin are provided to insulate against grounding.

Figure 2:
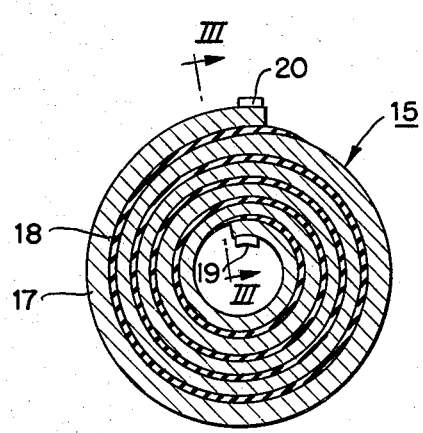
FIG. 2 shows a schematic plan view of a spirally wound, insulated resistor element suitable for use in the discharge resistor shown in FIG. 1.

The wound web arrangements 15a and 15b include strip-like resistor elements 17 typically comprised of metal, such as stainless steel, having a predetermined electrical conductivity. As shown in FIG. 2, strip-like resistor element 17 is preferably wound in a generally spiral manner. The number of winding turns is usually from 40 to 70 turns. An insulation layer 18 formed of organic compounds having good insulation characteristics, known in the art, is sandwiched between adjacent turns of the web or spiral.

Figure 3:
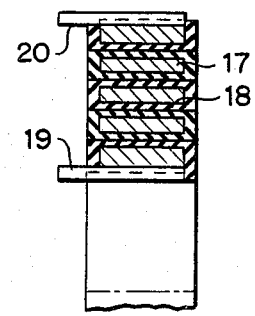
FIG. 3 shows a cross-section, partially cut away, taken along the line III—III in FIG. 2, of the spirally wound insulated resistor element shown in FIG. 2.
Figure 4:
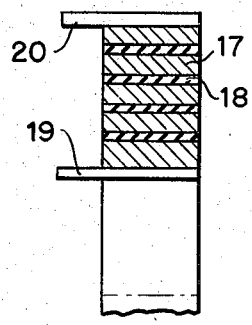
FIG. 4 shows a cross-sectional view, partially cut away, of a modified spirally wound insulated resistor element suitable for use in the discharge resistor of the present invention.

To obtain this insulation layer 18, resistor element 17 may be wrapped in insulation material, such as, for example, glass fiber reinforced insulation tape, before web 15 is wound. A cross-section of a wound web arrangement 15 constructed in this manner is shown in FIG. 3. Terminals 19 and 20 are provided at each of the ends of resistor element 17. Web 15 may also be wound simultaneously by inserting strip-like insulation material having substantially the same width as that of the strip-like member 17 between adjacent turns. A cross-section of such a wound web arrangement 15 is shown in FIG. 4. Electrical terminals 19 and 20 are also provided as previously noted.

It should be noted that the voltage difference between the adjacent turns in the wound web arrangement 15 is not as high as to require that insulation layer 18 provide high levels of insulation. This makes it possible to employ a thin insulation layer 18.

If desired, strings of insulating material may be used to bind the wound web arrangement 15 in a substantially radial direction, thereby preventing the arrangement from coming loose.

Referring again to FIG. 1, wound web arrangement 15a, constructed as described above, and having terminals 19a and 20a, is embedded in the annular recess provided in the casing 12a. The clearance between the wound web arrangement 15a and the inner wall of the annular recess of casing 12a is filled with insulation material, so that the wound web arrangement 15a and the casing 12a are rigidly united. For example, the clearance may be resinated in a vacuum-like atmosphere thus filling the resin without voids, with the resin being cured to a state of hardness. In this manner an insulation layer 16a which gives not only insulation against ground potential but also integral relation between the web arrangement 15a and the casing 12a may be obtained, so that an integral resistor unit 10a is obtained.

Resistor unit 10b of similar construction. The wound web arrangement 15b includes resistor element 17b wound in the same direction as resistor element 17a, and also includes terminals 19b and 20b extending so as to face terminals 19a and 20a, respectively.

As may be easily understood, resistor units 10a and 10b are constructed in a manner which facilitates manufacturing, since flatwise winding of the strip-like resistor elements 17 and 18 is considerably easier than the edgewise winding of prior art resistors.

Resistor units 10a and 10b are mounted on shaft 11 at predetermined positions such that the embedded web arrangements 15a and 15b face each other at a distance D apart, as shown in FIG. 1. Terminals 20a and 20b are electrically connected to form a substantially non-inductive discharge resistor having terminals 19a and 19b. This results from the fact that the respective magneto-motive forces produced by wound web arrangements 15a and 15b are mutually cancelled.

It is possible to use a wound web arrangement 15b having a strip-like member 17b which is wound in a direction opposite to the direction in which strip-like resistor element 17a of web arrangement 15a is wound, by simply connecting terminals 19a and 20b or by connecting terminals 19b and 20a.

It should be noted that the distance D between units 10a and 10b is preferably determined by taking the two factors discussed below into consideration. For cancelling magneto-motive forces, the distance D should be as 1. A discharge resistor adapted to be mounted on a rotatable shaft of a dynamo-electric device, comprising:
   a pair of strip-like resistor elements, each of said elements being spirally wound in a flatwise manner, with the central portion of said spiral winding defining a bore having an effective diameter greater than that of said shaft;
   insulation means for insulating adjacent turns of the wound resistor elements from one another;
   the wound, insulated resistor elements being arranged and electrically connected in series such that the inductive impedances appearing across the respective elements effectively cancel each other; and
   means for supporting the wound, insulated resistor elements approximately coaxially with said shaft at predetermined positions.

2. A discharge resistor according to claim 1, wherein said support means includes a pair of disk-like casings adapted to be mounted coaxially on said shaft in side-by-side relation, each casing having an annular recess for receiving one of said wound, insulated resistor elements and supporting said elements.

3. A discharge resistor according to claim 1 wherein said insulation means comprises an insulation layer surrounding said strip-like resistor elements.

4. A discharge resistor adapted to be mounted on a rotatable shaft of a dynamo-electric device, said resistor comprising:
   a pair of strip-like resistor elements, each of said elements being spirally wound in a flatwise manner with the central portion of said spiral winding defining a bore having an effective diameter greater than that of said shaft, said wound resistor elements being arranged and electrically connected in series such that the inductive impedances appearing across the respective elements effectively cancel each other;
   insulation means for insulating adjacent turns of said wound resistor elements from one another; and
   means for supporting said wound, insulated resistor elements approximately coaxially with said shaft at predetermined positions, said supporting means including a single, disk-like casing adapted to be mounted on said shaft and having an annular recess for receiving said wound, insulated resistor elements in side-by-side relation.

5. A discharge resistor adapted to be mounted on a rotatable shaft of a dynamo-electric device, said resistor comprising:
   a pair of strip-like resistor elements, each of said elements being spirally wound in a flatwise manner with the central portion of said spiral winding defining a bore having an effective diameter greater than that of said shaft, said wound resistor elements being arranged and electrically connected in series such that the inductive impedances appearing across the respective elements effectively cancel each other;
   insulation means for insulating adjacent turns of said wound resistor elements from one another; and
   means for supporting said wound, insulated resistor elements approximately coaxially with said shaft at predetermined positions, said supporting means including a single, disk-like casing adapted to be mounted on said shaft and having a pair of annular recesses adjacent through a disk-like wall portion, each of said recesses receiving one of said wound, insulated resistor elements.

6. A discharge resistor adapted to be mounted on a rotatable shaft of a dynamo-electric device, said resistor comprising:
   a pair of strip-like resistor elements, each of said elements being spirally wound in a flatwise manner with the central portion of said spiral winding defining a bore having an effective diameter greater than that of said shaft, said wound resistor elements being arranged and electrically connected in series such that the inductive impedances appearing across the respective elements effectively cancel each other;
   insulation means for insulating adjacent turns of said wound resistor elements from one another; and
   means for supporting said wound, insulated resistor elements approximately coaxially with said shaft at predetermined positions, said supporting means including a pair of disk-like casings adapted to be mounted coaxially on said shaft in side-by-side relation and separated by an air gap, each of said casings having an annular recess for receiving one of said wound, insulated resistor elements and for supporting said elements, said casings including passages along said shaft to allow the air flow from opposite sides of said casings toward and through said air gap between said casings.

7. A discharge resistor according to claim 6, further comprising fan means provided between said casings for causing radially outward air flow through said air gap.

8. A discharge resistor according to claim 7, wherein said fan means includes a plurality of fan members extending radially from said central portion.

9. A discharge resistor according to claim 8, wherein said fan members have insulation means at portions thereof facing said wound, insulated resistor elements.

10. A discharge resistor according to claim 6, wherein said disk-like casings include furrows in their outer surfaces to promote heat transfer.

11. A discharge resistor adapted to be mounted on a rotatable shaft of a dynamo-electric device, said resistor comprising:
    a pair of strip-like resistor elements, each of said elements being spirally wound in a flatwise manner with the central portion of said spiral winding defining a bore having an effective diameter greater than that of said shaft, said wound resistor elements being arranged and electrically connected in series such that the inductive impedances appearing across the respective elements effectively cancel each other;
    insulation means for insulating adjacent turns of said wound resistor elements from one another; and
    means for supporting said wound, insulated resistor elements approximately coaxially with said shaft at predetermined positions, said supporting means including a pair of disk-like casings adapted to be mounted coaxially on said shaft in side-by-side relation and separated by an air gap, each of said casings having an annular recess for receiving one of said wound, insulated resistor elements and for supporting said elements, wherein said shaft includes longitudinal passages to allow air flow from opposite sides of said casings toward and through said air gap between said casings.

12. A discharge resistor adapted to be mounted on a rotatable shaft of a dynamo-electric device, said resistor comprising:

small as possible. However, heat dissipation from the facing surfaces of units 10a and 10b is reduced as the distance D is decreased because the air near such surfaces moves with the surfaces.

In operation, terminals 19a and 19b are usually connected to shunt the field coil (not shown) of the motor during startup, with a-c current flowing through the discharge resistor 10a, 10b. Magneto-motive forces due to this current are substantially cancelled, as described above. Furthermore, since casings 12a and 12b are made of non-magnetic material, there is substantially no magnetic circuit, and hence, leakage of magnetic flux due to flux around each portion of the web itself is relatively small. Thus, the discharge resistor 10a, 10b of the present invention, having terminals 19a and 19b, provides negligibly small inductive impedance.

Heat generated in each resistor web 15a and 15b is effectively transferred to the surfaces of each casing 12a and 12b through relatively thin insulation layers 16a and 16b (shown in FIG. 1), and is dissipated to the surrounding air. Electrical insulation material generally possesses thermal insulation characteristics, and hence, effective heat transfer depends on the thickness of insulation layers 16a, 16b. As shown in FIG. 1, a relatively thin insulation layer can be employed, as described above, thus resulting in good heat transfer. Furthermore, each of the resistor units 10a and 10b are preferably constructed as integral units, as described above, which also contributes to good heat transfer. Heat transferred to the surfaces of resistor units 10a and 10b is easily dissipated to the surrounding air, so that good heat dissipation can be attained.

Good heat dissipation makes it possible to restrict the temperature rise to a relatively low level, which, in turn, makes it possible to employ organic insulation material such as epoxy resin. Organic insulation material is not likely to suffer from a deterioration in quality due, for example, to absorption of humidity.

The use of relatively long strips 17 of resistor material having relatively small resistivity per unit length increases the volume occupied by the resistor elements 17 to a relatively large portion of the total volume of the discharge resistor 10a, 10b. Thus, the temperature rise of the discharge resistor, when used in shunting the field coils of the motor only during start up, is easily reduced.

Although the volume of web arrangement 15 is somewhat larger than that of typical prior art resistors, the reduction in the volume of the insulation material is so great that the total volume of the discharge resistor is smaller than that of typical prior art resistors. In this connection, the disk-like portion 13a of the casing 12a is used mainly for ease of manufacturing (i.e., the portion 13a mainly functions as sealing in resinating), and accordingly, the thickness of the portion 13a can be designed to be relatively small. However, a certain thickness is required for the peripheral portion 14a of the casing 12a for safety purposes in view of the substantial centrifugal force acting on the wound web arrangement 15 during rotation. Furthermore, the relatively thin disk-like portion 13a also facilitates heat transfer. This, as a whole, contributes to reducing the size of the discharge resistor.

Figure 5:
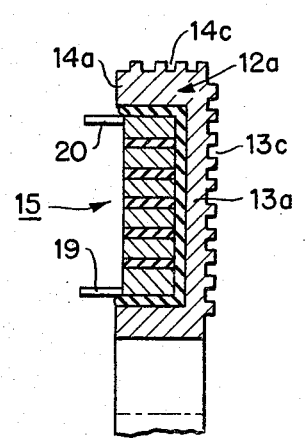
FIG. 5 shows a schematic cross-sectional view, partially cut away, of another embodiment of a resistor unit including a spirally wound, insulated resistor element according to this invention.

Referring now to FIG. 5, casing 12a is shown, having a peripheral portion 14a and a disk-like portion 13a as described above. According to this embodiment of the invention, the outer surfaces of the portions 13a and 14a have furrows 13c and 14c, respectively, which act as cooling fins to increase heat dissipation.

Figure 6:
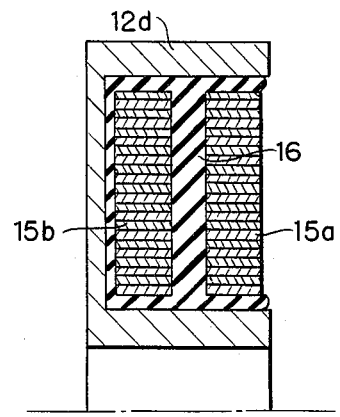
FIG. 6 shows a cross-sectional view, partially cut away, of another embodiment of a discharge resistor according to this invention.
Figure 7:
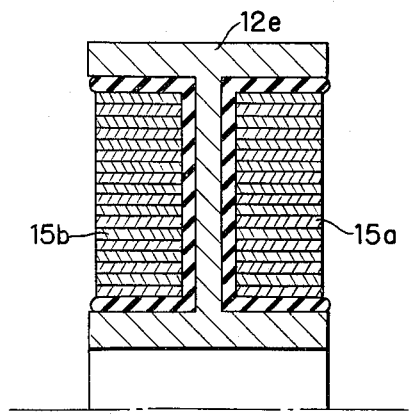
FIG. 7 shows a cross-sectional view, partially cut away, of still another discharge resistor of this invention.

Referring to FIGS. 6 and 7, which show additional discharge resistor embodiments according to this invention, a pair of wound web arrangements 15a and 15b are enclosed in a single casing 12d and 12e, respectively. In FIG. 6, the casing 12d has a relatively deep recess in which wound web arrangements 15a and 15b are both embedded with an insulation layer 16 therebetween. In FIG. 7, casing 12e has a pair of recesses, each opening in the opposite direction. Wound web arrangements 15a and 15b are embedded in the respective recesses.

Referring now to FIGS. 8-12, there are shown still other discharge resistor embodiments according to this invention having further improvement in heat dissipation. In these drawings, identical or similar parts to those shown in FIG. 1 are indicated by the same reference numerals used in FIG. 1, and, for simplicity, the following explanation will be focused on the improvement in heat dissipation.

Figure 8:
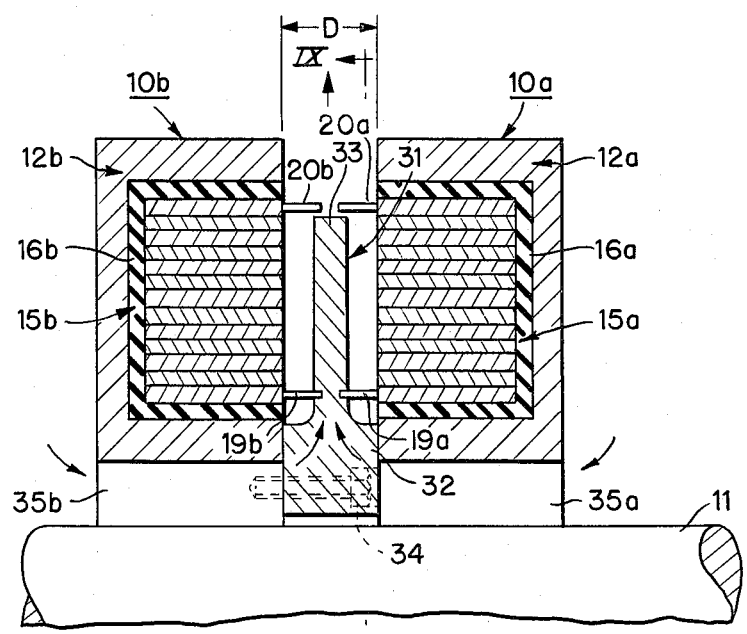
FIG. 8 shows a cross-sectional view, partially, cut away, of a further discharge resistor according to this invention having improved heat dissipation.
Figure 9:
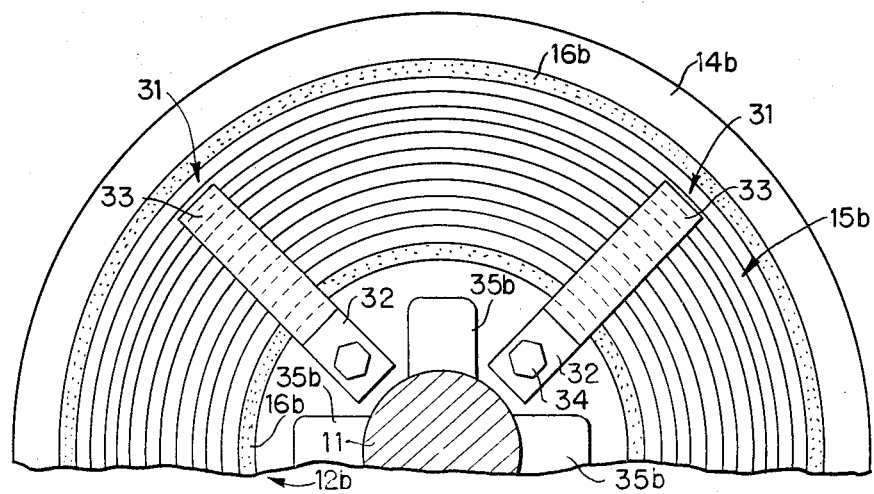
FIG. 9 shows a schematic plan view, partially cut away, of the embodiment shown in FIG. 8 when viewed along the line IX—IX in the direction as indicated by the arrows.

In FIGS. 8 and 9, fan members 31 extending radially from the central portion of casing 12a are provided between resistor units 10a and 10b. Each of the fan members 31 have a base portion 32 near the central portion of the casing 12b (the base portion having the same width as the distance D between the resistor units) and a fan portion 33 having a reduced width to leave insulation distance between it and wound web resistor arrangements 15a and 15b. Fan member 31 is secured to casing 14b by means of bolt 34, which is countersunk into fan member 31 as shown.

In operation, upon rotation of shaft 11, fan member 31 acts as a fan to cause air flow radially outward as indicated by the arrows. Accordingly, air outside the resistor units 10a and 10b flows through passages 35a and 35b to the clearance between the units, as indicated by the arrows. Improved heat dissipation can thus be obtained. This makes it possible to employ a narrower spacing distance D, which, in turn, permits reduction of the indicative impedance of the discharge resistor.

Figure 10:
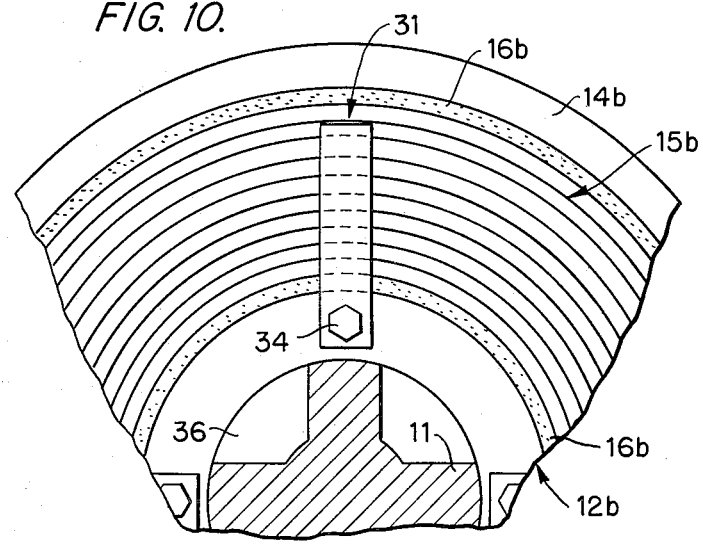
FIG. 10 shows a schematic plan view, partially cut away, of a modification of the embodiment shown in FIG. 8.

In the alternative embodiment shown in FIG. 10, shaft 11 is provided with passages 36 extending along its length.

Figure 11:
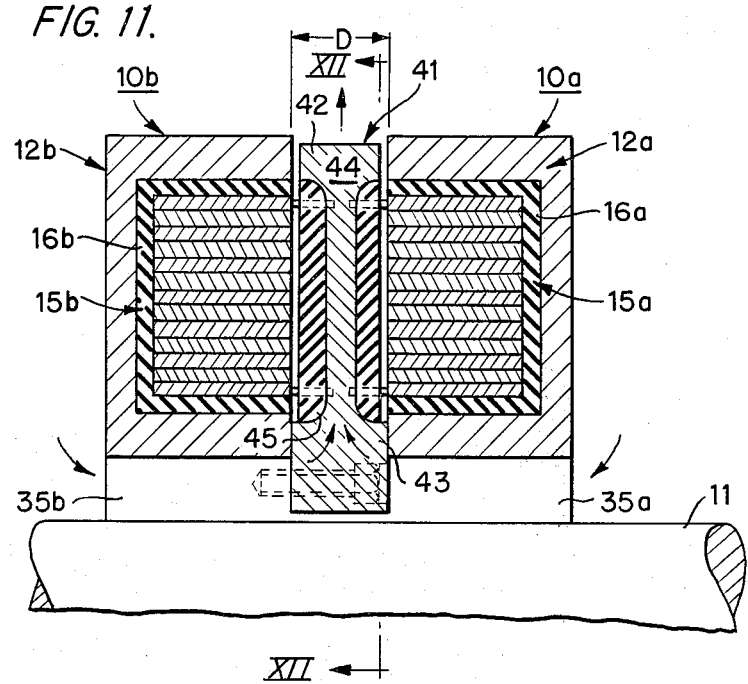
FIG. 11 shows a cross-sectional view, partially cut away, of a still another embodiment of the invention having improved heat dissipation.
Figure 12:
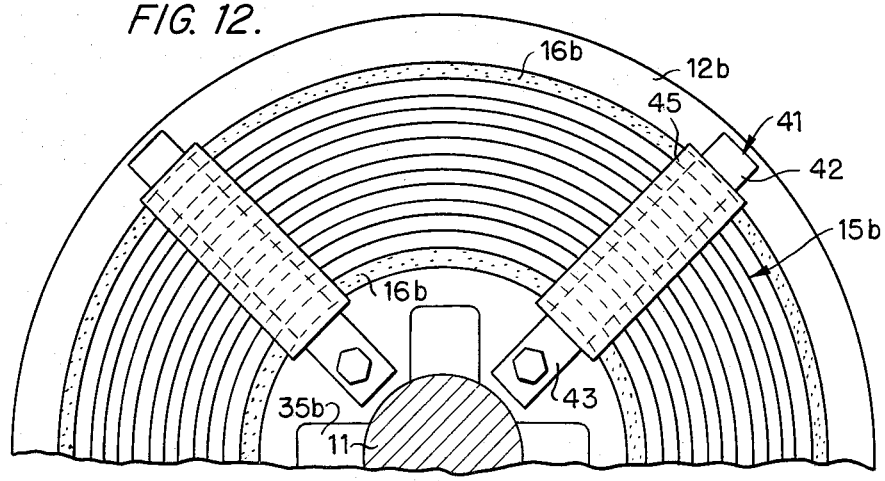
FIG. 12 shows a schematic plan view, partially cut away, of the embodiment shown in FIG. 11 when seen along the line XII—XII in the direction as indicated by the arrows.

Referring to FIGS. 11 and 12, and the embodiment shown therein, modified fan members 41, corresponding generally to fan members 31 in FIG. 8, are provided. Fan member 41 has at its free end portion, a wide width portion 42, which has a slightly narrower width than that of base portion 43. Insulation material 45 is preferably provided around a reduced-width portion 44, such that thin clearances are provided between the insulation material and the wound web arrangements 15a and 15b. The width of the fan member 41, except the base portion 43 thereof, is slightly narrower so that, except for the base portion 43, close tolerances in manufacturing are not required. According to this embodiment, insulation material 45 serves not only to insulate against grounding, but also to prevent the wound web arrangements 15a and 15b from slipping out of casings 12a and 12b.

It will be apparent to those skilled in the art that various modifications and variations can be made in the discharge resistor of the present invention without departing from the scope or the spirit of the invention. Thus, it is intended that the present invention cover the modifications and variations of this invention, provided they come within the scope of the appended claims and their equivalents.

What is claimed is:

a pair of strip-like resistor elements, each of said elements being spirally wound in a flatwise manner with the central portion of said spiral winding defining a bore having an effective diameter greater than that of said shaft, said wound resistor elements being arranged and electrically connected in series such that the inductive impedances appearing across the respective elements effectively cancel each other;

a strip-like insulation layer for insulating adjacent turns of the wound resistor elements from one another, said insulation layer having substantially the same width as said strip-like resistor elements and being sandwiched between adjacent turns of said strip-like resistor elements; and means for supporting said wound, insulated resistor elements approximately coaxially with said shaft at predetermined positions.

13. A discharge resistor adapted to be mounted on a rotatable shaft of a dynamo-electric device, said resistor comprising:

a pair of strip-like resistor elements, each of said elements being spirally wound in a flatwise manner with the central portion of said spiral windings defining a bore having an effective diameter greater than that of said shaft, said wound resistor elements being arranged and electrically connected in series such that the inductive impedances appearing across the respective elements effectively cancel each other;

insulation means for insulating adjacent turns of the wound resistor elements from one another; and means for supporting the wound, insulated resistor elements approximately coaxially with said shaft at predetermined positions, said supporting means including a pair of disk-like casings adapted to be mounted coaxially on said shaft in side-by-side relation, each of said casings having an annular recess for receiving one of said wound, insulated resistor elements and for supporting said elements, said disk-like casings including furrows in their outer surface to promote heat transfer.

* * * * *